United States Patent [19]
Gehrs et al.

[11] 3,995,103
[45] Nov. 30, 1976

[54] ELECTRICAL BUSSING AND JUMPER ASSEMBLY

[75] Inventors: Donald F. Gehrs, Affton; David T. Higgins, Imperial, both of Mo.

[73] Assignee: Zinsco Electrical Products, St. Louis, Mo.

[22] Filed: Dec. 11, 1975

[21] Appl. No.: 639,646

[52] U.S. Cl. .............................. 174/72 B; 317/119; 339/198 N
[51] Int. Cl.² ...................... H02B 1/20; H02G 5/00
[58] Field of Search ............... 174/68 B, 70 B, 71 B, 174/72 B; 317/112, 118, 119, 120; 339/22 B, 198 R, 198 N

[56] References Cited
UNITED STATES PATENTS

| | | | |
|---|---|---|---|
| 2,632,039 | 3/1953 | Hammerly et al. | 317/119 |
| 2,738,446 | 3/1956 | Fleming | 317/119 |
| 3,356,906 | 12/1967 | Lamb et al. | 317/119 X |

Primary Examiner—Laramie E. Askin
Attorney, Agent, or Firm—Peter Xiarhos; Elmer J. Nealon; Norman J. O'Malley

[57] ABSTRACT

An electrical bussing and jumper assembly for use with electrical switching devices such as circuit breakers in a three-phase distribution system. The bussing and jumper assembly comprises a plurality (three) of relatively thin, wide, bus plates stacked together in a compact sandwich-like array. Each of the plates has a plurality of jumper portions extending transversely through openings or cutouts provided in the bus plates superimposed thereover. The bus plates are insulated from each other by means of insulative coatings (e.g., of polyvinyl chloride) formed on the plates and also by means of sheets of insulative material (e.g., of polyethylene terephthalate) disposed between the coated bus plates and having openings therein aligned with the openings in the bus plates. Switching devices for use in a current distribution system are attached to the jumper portions of the bus plates, using threaded openings provided in the jumper portions.

10 Claims, 6 Drawing Figures

3,995,103

ELECTRICAL BUSSING AND JUMPER ASSEMBLY

BACKGROUND OF THE INVENTION

The present invention relates to an electrical bussing and jumper assembly and, more particularly, to an electrical bussing and jumper assembly for use with electrical switching devices in a panelboard for distributing current to a plurality of branch circuits.

Electrical bussing and jumper assemblies for use in panelboards are very well known to these skilled in the art. One very common type of bussing and jumper assembly, of a three-phase type, employs a plurality (e.g., three) of elongated flat metal bus bars of rectangular cross-section (e.g., 3/16–¼ inch thick) arranged in parallel and spaced from each other by predetermined distances related to the current rating of the assembly. A plurality of discrete metal jumper bars are bolted to the bus bars transverse to the lengths of the bus bars for connection to electrical devices such as circuit breakers, the jumper bars being spaced apart from each other through varying lengths of insulating sleeves (e.g., of polyvinyl chloride) made to surround one or more of the bus bars.

The above-described type of bussing and jumper assembly operates in a generally satisfactory manner. However, it has a number of disadvantages. A primary disadvantage is that the jumper bars, by virtue of being discrete elements, must be bolted onto the bus bars. The bolted connections may loosen or the bolts may not be tightened correctly during assembly, leading to poor heat dissipation and reduced efficiency and reliability. Further, the bolting on of the jumper bars and the cutting and installation of insulating sleeves of different lengths are costly labor operations, increasing the overall cost of the assembly. The use of insulating sleeves as described hereinabove also generally requires that the bus bars be spaced relatively widely apart, with the result that the finished assembly is not as rigid as might otherwise be the case. A further disadvantage of the above-described assembly is that heat produced during use of the assembly is conducted away from the assembly to adjoining elements (sub-pan, etc.) by radiation rather than distributing and dissipating the heat in the manner of a heat sink. This factor is significant when it is considered that excessive heat is a common cause of panelboard failure.

BRIEF SUMMARY OF THE INVENTION

An electrical bussing and jumper assembly is provided in accordance with the present invention which avoids the disadvantages and shortcomings of bussing and jumper assemblies as described hereinabove. The electrical bussing and jumper assembly in accordance with the invention includes a plurality of generally-flat bus plates stacked together in a sandwich-like array. The plurality of bus plates have openings therein and each of the bus plates has jumper portions adjacent to the openings for connection with electrical switching devices. The jumper portions of each bus plate are staggered with respect to the jumper portions of the other bus plates and the jumper portions of all of the bus plates are spaced from each other in the array. The assembly in accordance with the invention further includes insulation means electrically insulating the bus plates from each other and electrical connection means connected to the plurality of bus plates for establishing electrical current paths through the bus plates to the jumper portions of the bus plates.

BRIEF DESCRIPTION OF THE DRAWING

Various objects, features and advantages of an electrical bussing and jumper assembly in accordance with the present invention will be apparent from the following description taken in conjunction with the accompanying drawing in which.

DETAILED DESCRIPTION OF THE INVENTION

Figure 1:
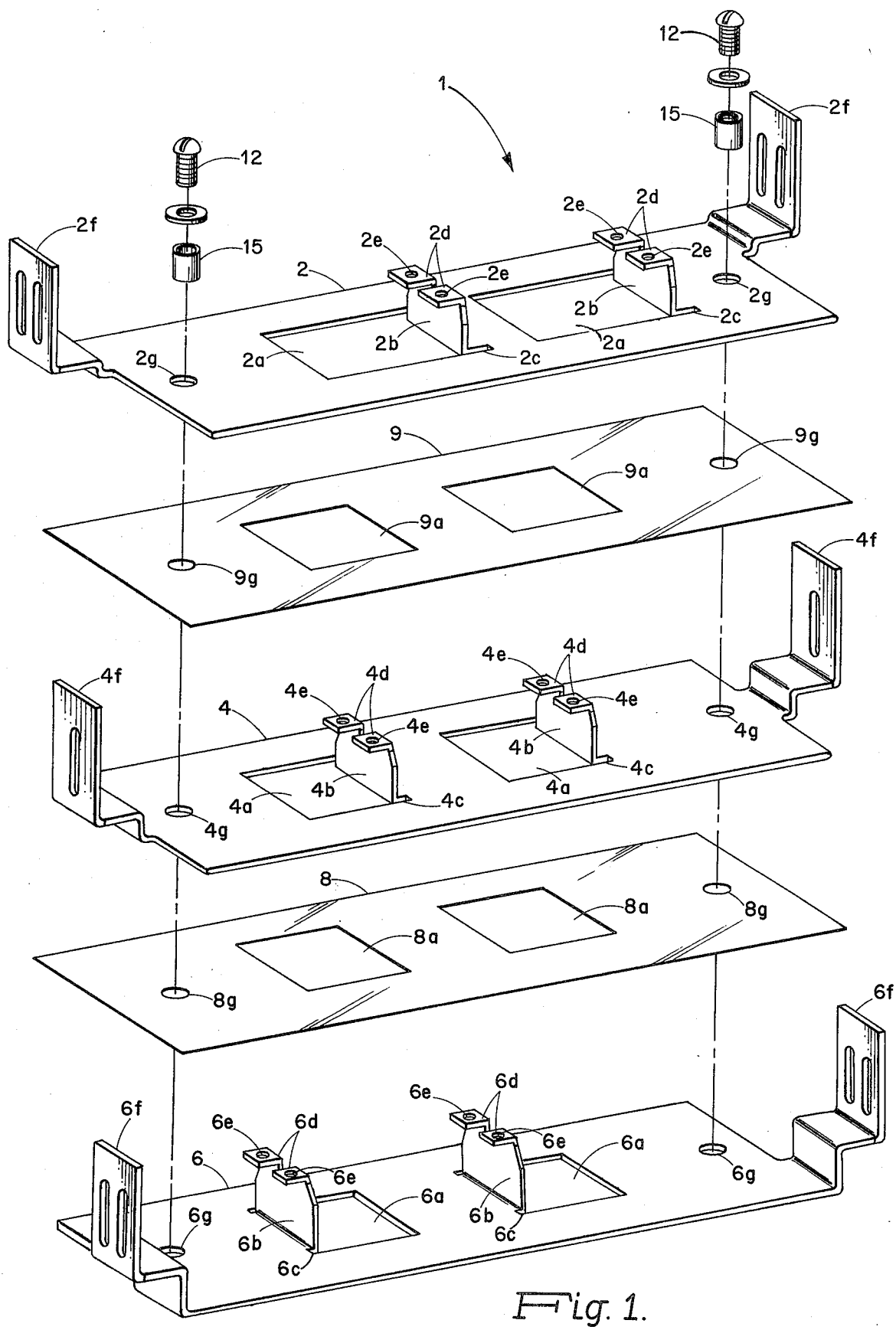
FIG. 1 is an exploded view of an electrical bussing and jumper assembly in accordance with the present invention.

Referring now to FIGS. 1–6, there is shown an electrical bussing and jumper assembly 1 in accordance with the present invention. As shown in the various figures, the bussing and jumper assembly 1 comprises a plurality of generally-rectangular, relatively-thin, wide bus plates 2, 4 and 6 separated by rectangular sheets 8 and 9 of insulating material. Each of the bus plates 2, 4 and 6 is coated over a major portion thereof by an insulating material, in a manner to be described hereinafter, and includes a plurality of spaced openings and spaced jumper portions. Specifically, and as best shown in FIG. 1, the bus plate 2 has a pair of spaced rectangular openings 2a therein and centrally-located jumper portions 2b formed at side edges 2c adjacent to the openings 2a, each of the jumper portions 2b further having a pair of flat side-by-side pad sections 2d with threaded openings 2e therein. Similarly, the bus plate 4 has a pair of spaced rectangular openings 4a therein and centrally-located jumper portions 4b formed at side edges 4c adjacent to the openings 4a with each of the jumper portions 4b further having a pair of flat side-by-side pad sections 4d with threaded openings 4e therein. The bus plate 6 similarly has a pair of spaced rectangular openings 6a therein and centrally-located jumper portions 6b formed at side edges 6c adjacent to the openings 6a with each of the jumper portions 6b further having a pair of flat side-by-side pad sections 6d with threaded openings 6e therein. The threaded openings 2e, 4e and 6e are used to secure electrical switching devices to the assembly, as will be explained more fully hereinafter. The aforementioned sheets 8 and 9 of insulating material, which are used to provide smooth interfaces between the coated bus plates, are also provided with spaced rectangular openings 8a and 9a, respectively.

Figure 2:
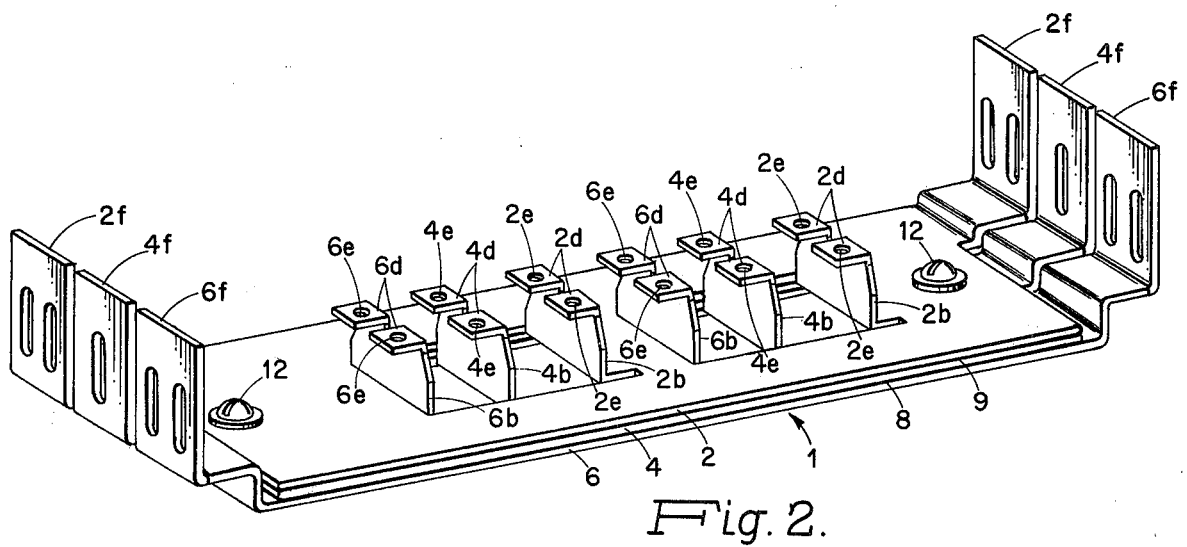
FIGS. 2, 3, and 4 are perspective, side and top views of the electrical bussing and jumper assembly in accordance with the present invention.
Figure 3:
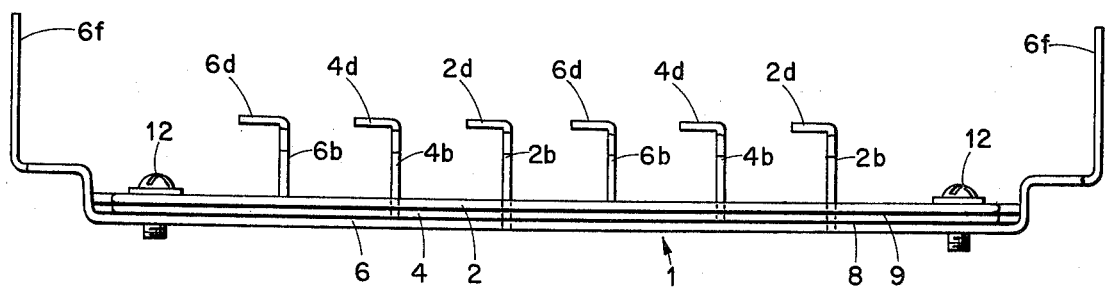
Figure 4:
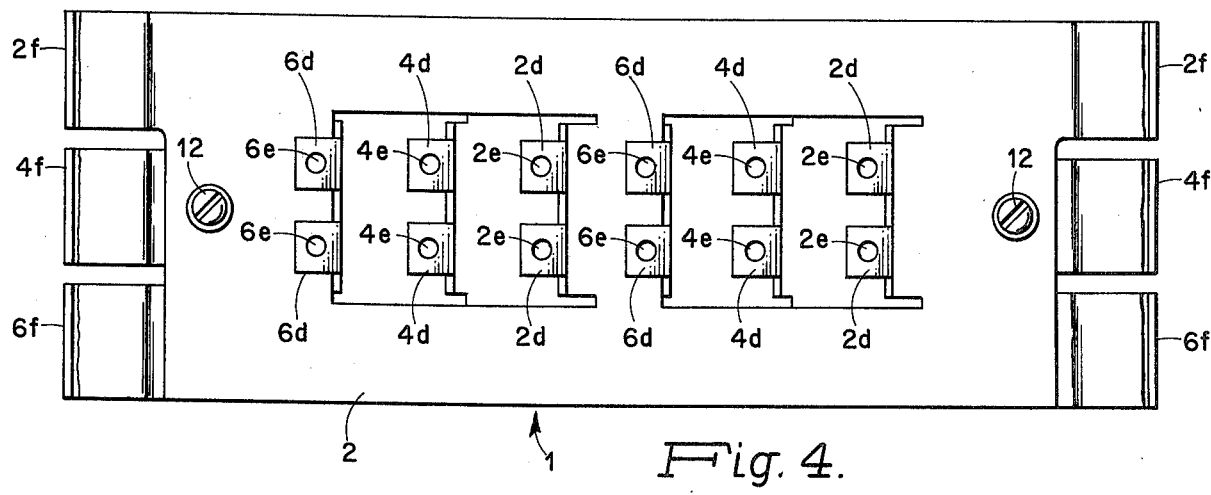
Figure 5:
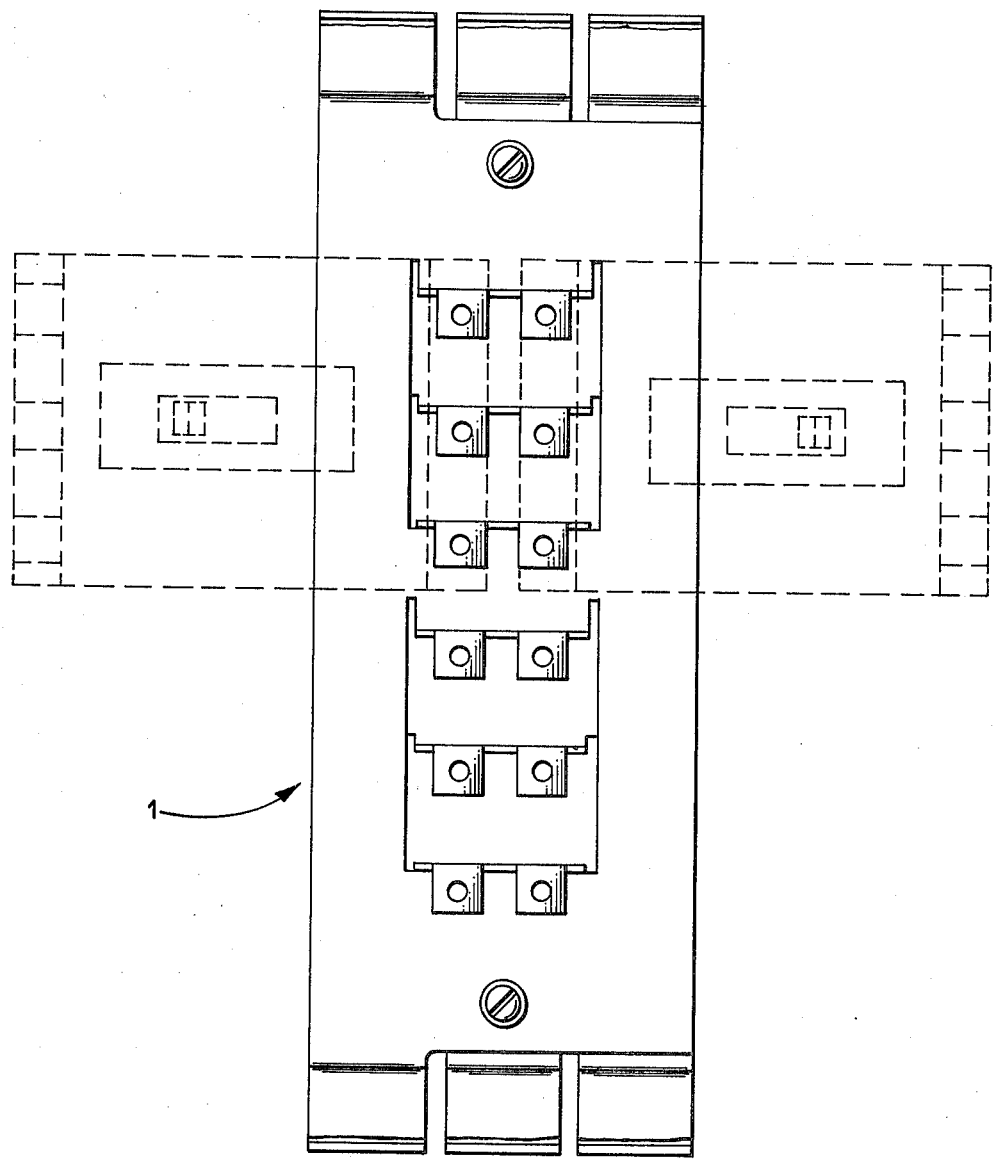
FIGS. 5 and 6 are top views of the electrical bussing and jumper assembly in accordance with the invention showing the manner in which multiple pole and single pole circuit breakers may be used therewith.
Figure 6:
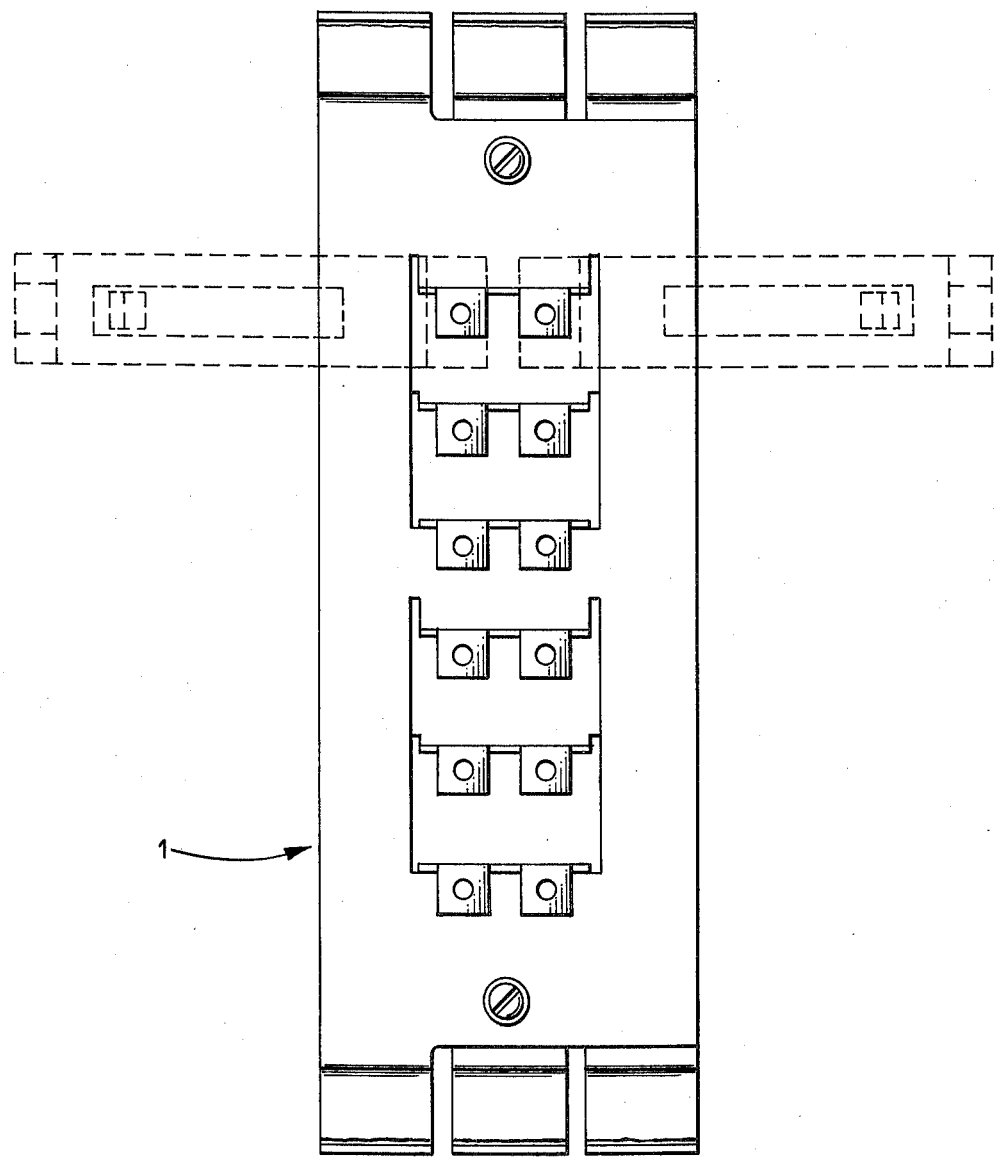

The above-mentioned openings 2a, 4a and 6a in the bus plates 2, 4 and 6 and the openings 8a and 9a in the sheets 8 and 9 of insulating material are sized in accordance with the invention so that when the individual bus plates and sheets of insulating material are stacked together, in the manner as best shown in FIGS. 2–4, the openings in the bus plates and sheets of insulating material are superimposed over each other and the jumper portions of each bus plate extend outwardly through the openings in the superimposed bus plates and sheets of insulating material. As indicated in FIGS. 1–4, the jumper portions of each of the bus plates are staggered with respect to the jumper portions of the other bus plates so that in the assembled array as shown in FIGS. 1–4 the jumper portions are equally spaced from each other, for example, by 1⅛ inches. Some typical dimensions for the openings $2a$, $4a$ and $6a$ of the bus plates 2, 4 and 6 which achieve the above results are 3½ in. long by 2⅝ in. wide (openings $2a$), 2⅛ in. long by 2⅝ in. wide (openings $4a$) and 2⅛ in. long by 2⅝ in. wide (openings $6a$). Typical dimensions for the openings $8a$ and $9a$ in the sheets 8 and 9 of insulating material are 2 in. long by 2⅝ in. wide. Each of the bus plates 2, 4 and 6 as described hereinabove typically has a length of 12⅝ in. and a width of 5 in. Each of the sheets 8 and 9 of insulating material typically has a length of 12⅝ in., a width of 5¼ in. and a thickness of 0.01 in. A suitable material for the bus plates 2, 4 and 6 is aluminum (⅛ in. thick) with a 0.02 in. coating of polyvinyl chloride, and a suitable material for the sheets 8 and 9 of insulating material is a polyethylene terephthalate material such as commonly sold under the trademark "Mylar".

Further in accordance with the invention, the heights of the jumper portions $2b$, $4b$ and $6b$ of the bus plates 2, 4 and 6 are selected so that when the bus plates and sheets of insulating material are stacked together as previously mentioned, the flat pad sections $2d$, $4d$ and $6d$ of the jumper portions of the bus plates lie in a common plane. To achieve this result, and as indicated in FIGS. 1–4, the jumper portions $6b$ of the bus plate 6 are made to have a height greater than the heights of the other jumper portions, the jumper portions $4b$ of the bus plate 4 are made to have the next greatest height, and the jumper portions $2b$ of the bus plate 2 are made to be the shortest. Some typical values for the heights of the jumper portions $2b$, $4b$ and $6b$ are ⅞ in., 1-1/16 in., and 1¼ in., respectively.

The bus plates 2, 4 and 6 as described hereinabove further have pairs of connecting members $2f$, $4f$ and $6f$ formed integrally at the end thereof for use in making electrical connections with external components for establishing current paths to the jumper portions of the bus plates. As indicated in the figures, especially FIG. 2, the pairs of connecting members $2f$, $4f$ and $6f$ are arranged with respect to the ends of the bus plates 2, 4 and 6 so that when the bus plates and sheets of insulating material are superimposed over each other as previously described, the pairs of connecting members $2f$, $4f$ and $6f$ are staggered with respect to each other and do not physically interfere with each other. This staggered relationship is readily and simply achieved by forming the connecting members $2f$ at the left-hand corners of the bus plate 2, by forming the connecting members $4f$ centrally of the bus plate 4, and by forming the connecting members $6f$ at the right-hand corners of the bus plate 6.

As previously indicated, the bus plates 2, 4 and 6 are coated over the major portions thereof with an insulating material. The coating of the plates 2, 4 and 6 may be readily achieved using well-known fluidized bed coating techniques. By way of example of how these techniques may be used with the present invention, the uncoated bus plates 2, 4 and 6 may first be heated to a temperature of approximately 600° F for approximately 10 minutes, then dipped in a fluidized powder bed (e.g., of polyvinyl chloride) and post-heated for approximately 10 seconds at approximately 600° F. After cooling of the plates 2, 4 and 6, the insulation on the flat pad sections $2d$, $4d$ and $6d$ and on the connecting member $2f$, $4f$ and $6f$ may be removed therefrom by physically stripping the insulation away from these parts. (Alternatively, the pad sections $2d$, $4d$ and $6d$ and the connecting members $2f$, $4f$ and $6f$ may be masked prior to the coating of the plates 2, 4 and 6). Once the above-described processing of the plates 2, 4 and 6 has been completed, the flat pad sections $2d$, $4d$ and $6d$ are preferably plated with tin, using well-known plating techniques, for increasing the electrical conductivity of the pad sections $2d$, $4d$ and $6d$.

To use the above-described bussing and jumper assembly 1 in a panelboard, it is only necessary to attach the assembly to a supporting structure such as a sub-pan (not shown) and, following the insertion of the assembly 1 and supporting structures within an enclosure (also not shown), to make the necessary electrical connections to the connecting members $2f$, $4f$ and $6f$ and to attach electrical devices such as circuit breakers to the assembly 1. The attachment of the assembly 1 to the sub-pan is readily accomplished by inserting threaded fasteners, such as shown at 12 in the figures, through aligned openings $2g$, $4g$ and $6g$ in the bus plates 2, 4 and 6 and openings $8g$ and $9g$ in the sheets of insulating material 8 and 9, and threading these fasteners into corresponding threaded openings in the sub-pan. To insure that the threaded fasteners 12 do not undesirably cut through the insulating coating in the vicinity of the openings $2g$, $4g$ and $6g$ in the bus plates 2, 4 and 6, a pair of insulating sleeves 15 are preferably first inserted within the openings $2g$, $4g$, $6g$, $8g$ and $9g$, as indicated in FIG. 1, and the threaded fasteners 12 then inserted within the insulating sleeves 15 and secured to the sub-pan. Pairs of circuit breakers, for example, three-phase, three-pole circuit breakers, may be attached to the assembly 1 in a side-by-side manner, for example, as shown in phantom in FIG. 5, by securing first sides of each pair of breakers to the flat side-by-side pad sections of three different portions, as by using screws with the threaded openings in the flat pad sections, and then securing the other sides of the breakers to members (e.g., rails) associated with the sub-pan. Alternatively, pairs of single-pole, single-phase circuit breakers may be attached to the assembly 1 in a side-by-side manner, for example, as shown in phantom in FIG. 6, by securing first sides of each pair of breakers to the flat side-by-side pad sections of a jumper portion, and then securing the other sides of the breakers to rails associated with the sub-pan.

It will now be apparent that an electrical bussing and jumper assembly 1 has been described hereinabove which offers significant advantages over prior art assemblies. The assembly 1, by virtue of the use of bus plates in a stacked array with centrally-located jumper portions, has substantial strength and rigidity and acts as a heat sink in conducting heat away therefrom as a single integral unit rather than by several discrete, spaced parts. Further, the forming of the jumper portions integrally with the bus plates eliminates the problem of loose or incorrectly installed bolts and jumper bars, poor heat dissipation, and poor electrical connections. The coating of the bus plates with an insulating material such as polyvinyl chloride eliminates the costly labor operations of cutting and fitting sleeves of insulating material of varying lengths.

While there has been described what is considered to be a preferred embodiment of the invention, it will be apparent to those skilled in the art that various changes and modifications may be made therein without departing from the invention as called for in the appended claims.

What is claimed is:

1. An electrical bussing and jumper assembly for use with electrical switching devices, said assembly comprising:
   a plurality of generally-flat elongated bus plates each having first and second generally centrally-located openings spaced along the length thereof, each of said openings being surrounded by the material of the bus plate and defining spaced-apart side portions bridged by a portion intermediate to the openings, each of said bus plates further having jumper portions or connection with electrical switching devices, the jumper portions of each bus plate being integral with the bus plate and formed at predetermined first side edges of the bus plate adjacent to the openings in the bus plate and spaced from opposing second side edges of the bus plate adjacent to said openings, the openings in the plurality of bus plates being located with respect to each other along the lengths of the bus plates and the jumper portions of each of the bus plates being positioned and staggered with respect to the jumper portions of the other bus plates so that when all of the bus plates are stacked together in a sandwich-like array the jumper portions of each bus plate extend outwardly through the openings in the superimposed bus plates and the jumper portions of all of the bus plates are spaced from each other in the array;
   insulation means electrically insulating the bus plates from each other; and
   electrical connection means connected to the plurality of bus plates for establishing electrical current paths through said bus plates to the jumper portions of said bus plates.

2. An electrical bussing and jumper assembly in accordance with claim 1 wherein the insulation means includes:
   insulation material coated onto each of the bus plates.

3. An electrical bussing and jumper assembly in accordance with claim 2 wherein the insulation material is polyvinyl chloride.

4. An electrical bussing and jumper assembly in accordance with claim 1 wherein:
   the openings in the plurality of bus plates include openings of different sizes.

5. An electrical bussing and jumper assembly in accordance with claim 1 wherein:
   the jumper portions associated with the different bus plates have different heights and include generally-flat integral pad sections for connection with electrical switching devices, the heights of the jumper portions associated with the different bus plates being selected so that the pad sections of the jumper portions of all of the bus plates lie in a common plane, said common plane being generally parallel to the planes of the bus plates.

6. An electrical bussing and jumper assembly in accordance with claim 5 wherein:
   the insulation means includes insulation material coated onto each of the bus plates.

7. An electrical bussing and jumper assembly in accordance with claim 6 wherein:
   the insulation material is polyvinyl chloride.

8. An electrical bussing and jumper assembly in accordance with claim 6 wherein:
   the insulation means further includes flat sheets of insulating material disposed between the bus plates, said sheets of insulating material having openings therein through which the jumper portions of the different bus plates extend.

9. An electrical bussing and jumper assembly in accordance with claim 5 wherein:
   the pad sections of the jumper portions have openings therein for use in attaching electrical switching devices to said pad sections.

10. An electrical bussing and jumper assembly in accordance with claim 5 wherein:
    the electrical connection means includes pairs of connecting members connected in a staggered manner to opposite ends of the bus plates.

* * * * *